United States Patent [19]
DuPont, deceased Jacques et al.

[11] Patent Number: 5,332,280
[45] Date of Patent: Jul. 26, 1994

[54] DEMOUNTABLE DEFLECTOR FOR SHIPPING CONTAINERS AND THE LIKE

[76] Inventors: DuPont, deceased Jacques, late of Quebec; by Alain DuPont, legal representative, 141 Des Noyers, Levis, Quebec, S6V-8W7

[21] Appl. No.: 958,822
[22] Filed: Oct. 9, 1992
[51] Int. Cl.⁵ ............................................... B62D 35/00
[52] U.S. Cl. .............................. 296/180.1; 296/180.4
[58] Field of Search ................. 296/180.1, 180.2, 180.4

[56] References Cited

U.S. PATENT DOCUMENTS 3,239,267  3/1966  Reynolds ...................... 296/180.4 X
4,966,407  10/1990  Lusk ................................ 296/180.1

FOREIGN PATENT DOCUMENTS 0593130  2/1934  Fed. Rep. of Germany ... 296/180.1
2445907  4/1975  Fed. Rep. of Germany ... 296/180.4

Primary Examiner—Dennis H. Pedder

[57] ABSTRACT

A air deflector for a shipping container comprises a plurality of panels and a supporting frame member, and interconnecting hooks. The panels are mountable onto, and demountable from the container easily by one person without necessitating the use of tools and when demounted are storable in a two dimensional arrangement.

14 Claims, 5 Drawing Sheets

DEMOUNTABLE DEFLECTOR FOR SHIPPING CONTAINERS AND THE LIKE

FIELD OF INVENTION

The invention relates to air deflectors for use with shipping containers, with the aim of reducing aerodynamic resistance and correspondingly the fuel consumption of land vehicles used for the transportation of such containers.

BACKGROUND OF THE INVENTION

Shipping containers are generally in the form of elongated cubes, with a door opening located in one of the elongated sides. The forward and rear faces of the container are provided with openings for hoisting the containers, which openings are in accordance with generally accepted international standards, separated by a center to center distance of 226 cm (89 in.).

It is well known to use aerodynamic deflectors with trucks and trailers and the like.

In U.S. Pat. No. 3,815,948 (Alford) there is disclosed a deflector for caravan type trailers. Such deflector is formed from flat panels permanently attached to the trailer by means of hinges which permit the panels to be folded back along the sides of the trailer.

In U.S. Pat. No. 4,458,936 (Mulholland) there is disclosed a fairing which secures to the rear face of a trailer. While it is indicated that the fairing is readily interchangeable between trailers, such trailers must be adapted to mount the fairing, and the transfer could not be accomplished by one person.

In U.S. Pat. No. 4,682,808 (Bilanin) there is disclosed a plurality of panels which are hingedly attached to the rear of the trailer, so that they may be folded up flat against the rear of the vehicle when not in use. Again it is necessary that the trailer be specifically adapted to mount the panels.

In U.S. Pat. No. 3,797,879 (Edwards) there is disclosed a prismatic deflector for attachment to the front wall of a large van or semi-trailer to extend over the top of the cab. While it is indicated that the deflector is demountable, it necessitates the specific adaptation of the van or semi-trailer for this purpose. Mounting and demounting of the deflector appear to necessitate the use of auxiliary means such as ladders or scaffolding, and more than one pair of hands.

Shipping containers are during the course of their use subject to very rough treatment, and particularly when they are used for the maritime shipment of goods, the containers are stocked side by side and end to end without leaving any space between them. Accordingly, any structure which projects outwardly will be crushed or torn away, and there is no possibility of permanently mounting any type of deflector to these containers. Accordingly, any deflector for use with a shipping container must be temporary, and be capable of being mounted when required and demounted when no required. The condition that the deflector be attached to the container only temporarily implies that the deflector will be available at the time that it is required, and that it be removable for storage when not required. The most simple and elegant manner of satisfying this dual requirement is that each tractor for hauling shipping containers be equipped with means for storing the defector. Accordingly, the driver can install the deflector as soon as it is required, and removed it upon delivery of the container. Desirably, the deflector must be mountable and demountable quickly by one person without necessitating any auxiliary equipment, preferably without necessitating the use of any tool. It is still further desirable that the deflector have a more or less universal applicability for use with all shipping containers without necessitating any modification of the containers or the use of any adaptor to accommodate the deflector to different styles of containers.

It is an object of this invention to provide a demountable air deflector for shipping containers.

It is a further object of this invention to provide demountable air deflectors that disassemble easily into a generally two dimensional form for storage and transportation.

It is another object of this invention to provide such demountable air deflectors that are mountable onto and demountable from containers by one person only without the use of any tool or other device.

It is yet another object of the invention to provide air deflectors that may be utilized with containers of different manufacturers without any adaptation.

In accordance with the board object of the invention, an air deflector for a shipping container or the like having fixed face and opposed upper corners thereto with openings therein that is easily demounted therefrom by one person without tools or assistance for storage and transportation in a generally two dimensional condition comprises a first planar isosceles triangular panel having a base and apex. A hook is provided adjacent the opposed ends of the base for engaging the corner openings of the container to suspend the first triangular panel from the shipping container adjacent the roof line thereof. A frame is provided including a strut portion releasably couplable to the first triangular portion adjacent the apex thereof to depend downwardly therefrom in oblique relationship, the strut portion serving to permit a person to hoist the first triangular portion into position to engage the hooks with corner opening of the container, or to disengage them when the air deflector is to be demounted. The frame includes at least one portion that will bear on the fixed face of the container to retain the strut in spaced apart relationship therefrom in a preferably vertical position, whereby the first triangular panel will extend downwardly outwardly from the fixed face of the container. The air deflector also includes second and third generally similar panels each having at least three sides, the first one of which has a length generally equal to the side of the first triangular panel. Cooperating hook means are provided on the first side of each of the second and third panels and the respective sides of the first triangular panel whereby the second and third panels may be suspended from the first panel. The second and third panels are proportioned so that when suspended in this manner, a second side thereof will be contiguous with the fixed face of the container, and a third side of the second panel will be adjacent along its length to the third sides of the third panel, the third sides in effect residing approximately in a vertical plane at right angles to the fixed face of the container. Means is provided for releasably retaining the third sides in their adjacent relationship.

Preferably, the second and third panels are trapezoidal, with the second and third sides thereof being parallel, whereby when the second and third panels are suspended from the first panel, the second and third sides will be vertical.

Desirably, the air deflector includes a pair of similar triangular flaps each having a first side generally coextensive with the fourth side of the trapezoidal are provided for releasably retaining the third side of the flaps in their adjacent relationship, the triangular panel, the trapezoidal panels and the flaps together with the fixed face of the container forming closed, hollow six sided figure symmetrical about the above mentioned vertical plane.

Conveniently the first triangular panel comprises similar left and right hand portions respectively residing on opposed sides of the vertical plane, which portions are hinged together so as to be movable between an open, generally coplanar position and a closed, superposed position for storage. Preferably means is provided for supporting the left and right hand portions in the open position to facilitate the placement of panel on the shipping container. Suitably the frame includes an upper portion that is secured to one of the left and right hand portions, to which upper frame portion the strut portion is releasably connectible. The upper frame portion is conveniently provided with a bracket that abuts the roof and the fixed wall of the container at the juncture thereof to render the air deflector more rigid. Preferably also, the frame portion that bears on the fixed face of the container to retain the strut in spaced apart relation comprises a telescopically adjustable brace to permit small adjustments to the verticality of the strut portion of the frame.

These foregoing objects and aspects of the invention, together with other objects, aspects and advantages thereof will be more apparent from the following description of a preferred embodiment thereof, taken in conjunction with the following drawings.

DESCRIPTION OF THE PREFERRED EMBODIMENT

Figure 1:
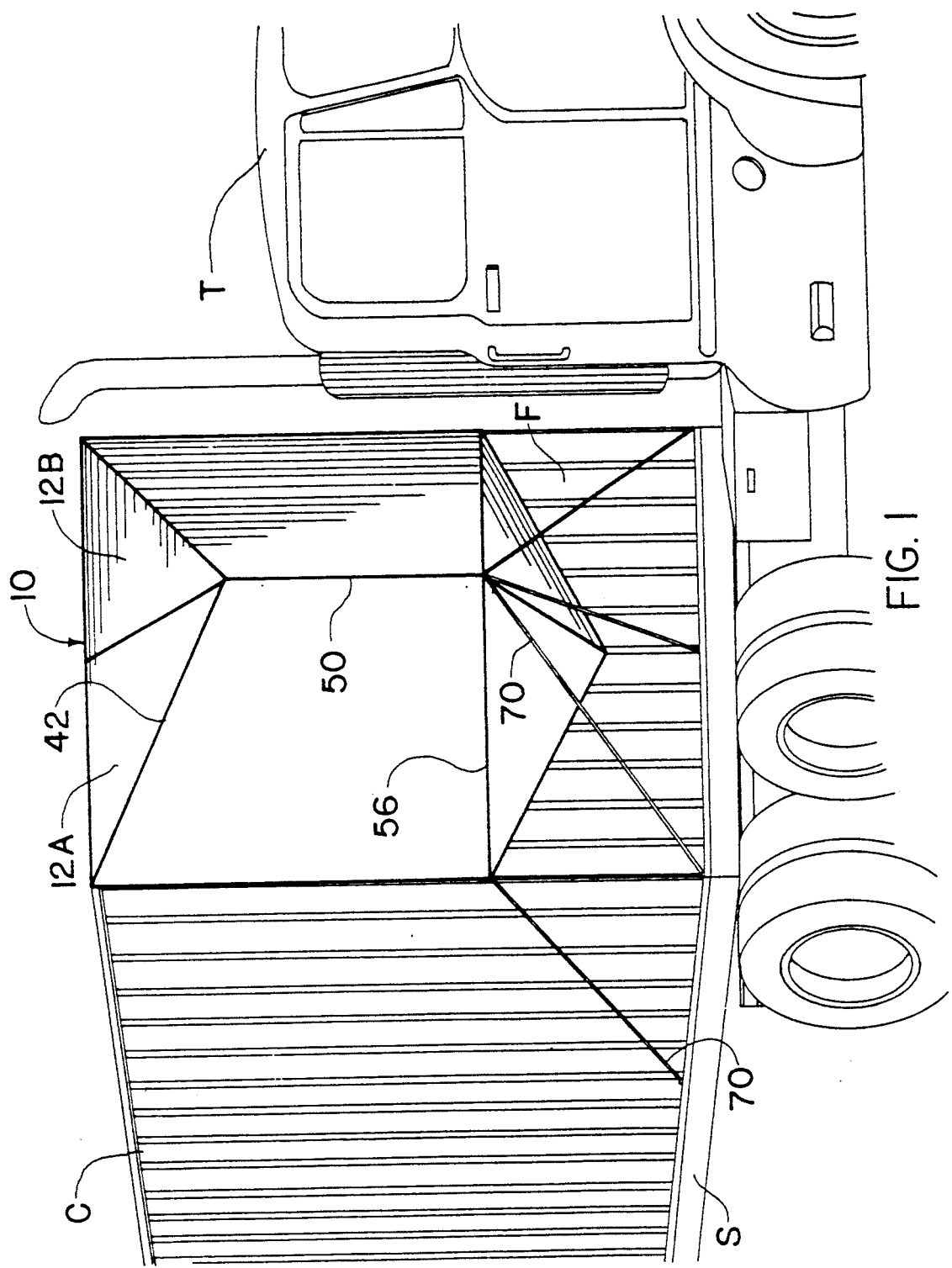
FIG. 1- shows the air deflector of the invention installed on a shipping container.

Referring to the drawings in detail a shipping container C is seen in FIG. 1 loaded onto a semi-trailer S drawn by a tractor T. Container C has a front end F which may otherwise be referred to as a fixed end, which is to say that it is devoid of any access door therein.

Shipping container C has corner sockets X which provides points for the attachment of crane hooks or the like.

The air deflector of the invention is identified generally by the numeral 10. Deflector 10 comprises a first triangular panel 12 having a base 14 and a frame upper portion 24, which is rigidly secured to the triangular panel 12 along the median thereof passing through apex 16. An angular bracket 26 is secured to the upper end of upper portion 24. The strut portion 22 of frame 20 is connected to the upper face portion 24 by means of a releasable coupling 28, which may comprise a simple pin 29 as illustrated; other means of greater or lesser complexity and convenience may be used for this purpose.

Triangular panel 12 is hoisted into position manually by means of support strut 22, to permit hooks 18 to engage with corner sockets X of container C for suspension of panel 12 therefrom, in which position bracket 26 will normally engage the roof and upper edge of the container to provide a central support for panel 12 and air deflector 10.

Panel 12 extends obliquely downwardly from the face F of container C, and is retained more or less in this position by means of a brace 30 which extends rearwardly from strut portion 22 of frame 20 intermediate the ends thereof. Brace 30 is telescopically extensible to permit small adjustments in the length thereof for adjusting the verticality of strut portion 22.

Figure 3:
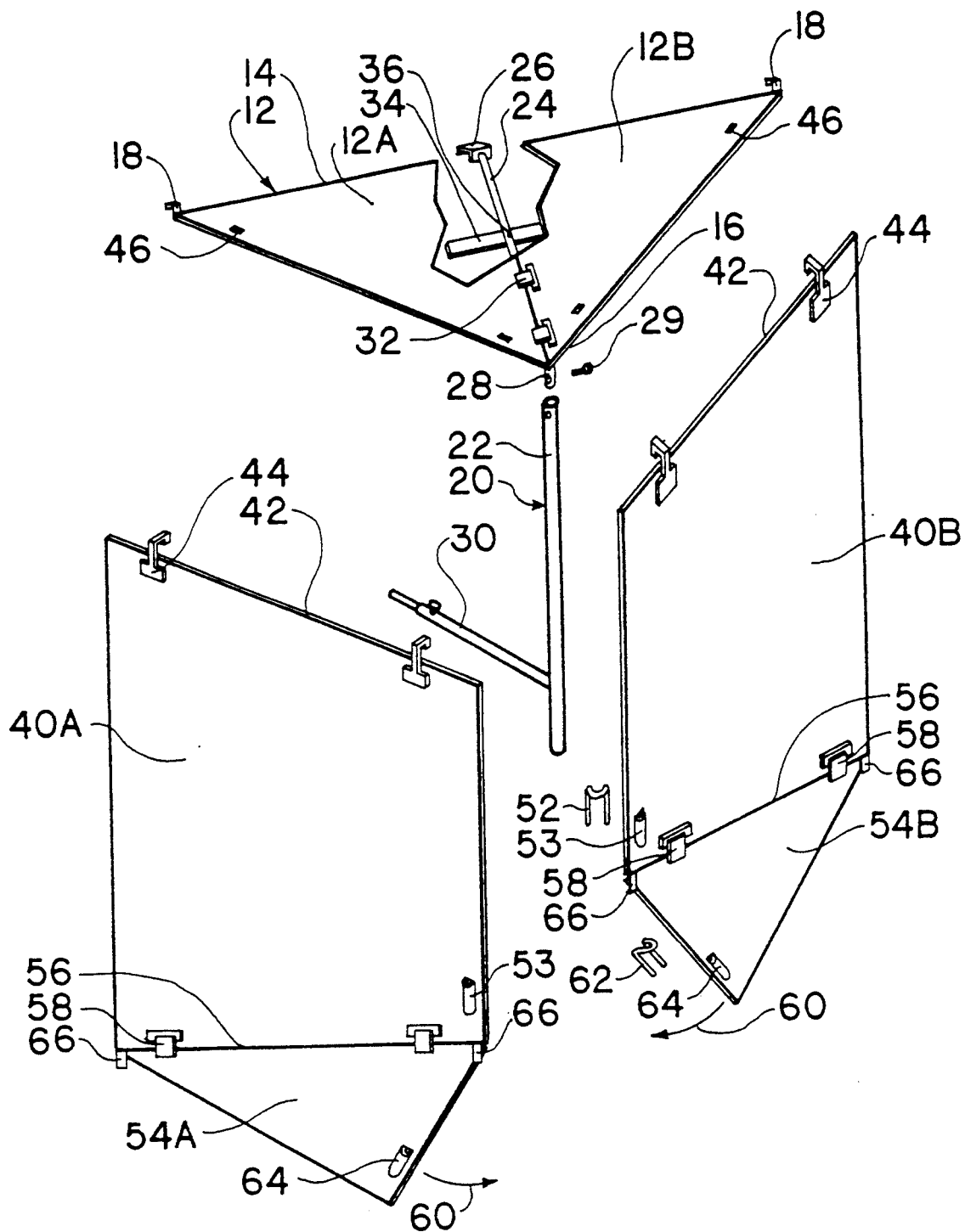
FIG. 3- shows in exploded view the component parts of the air deflector of FIG. 1, partially broken away to reveal detail, with other hidden detail shown in dotted outline.
Figure 4:
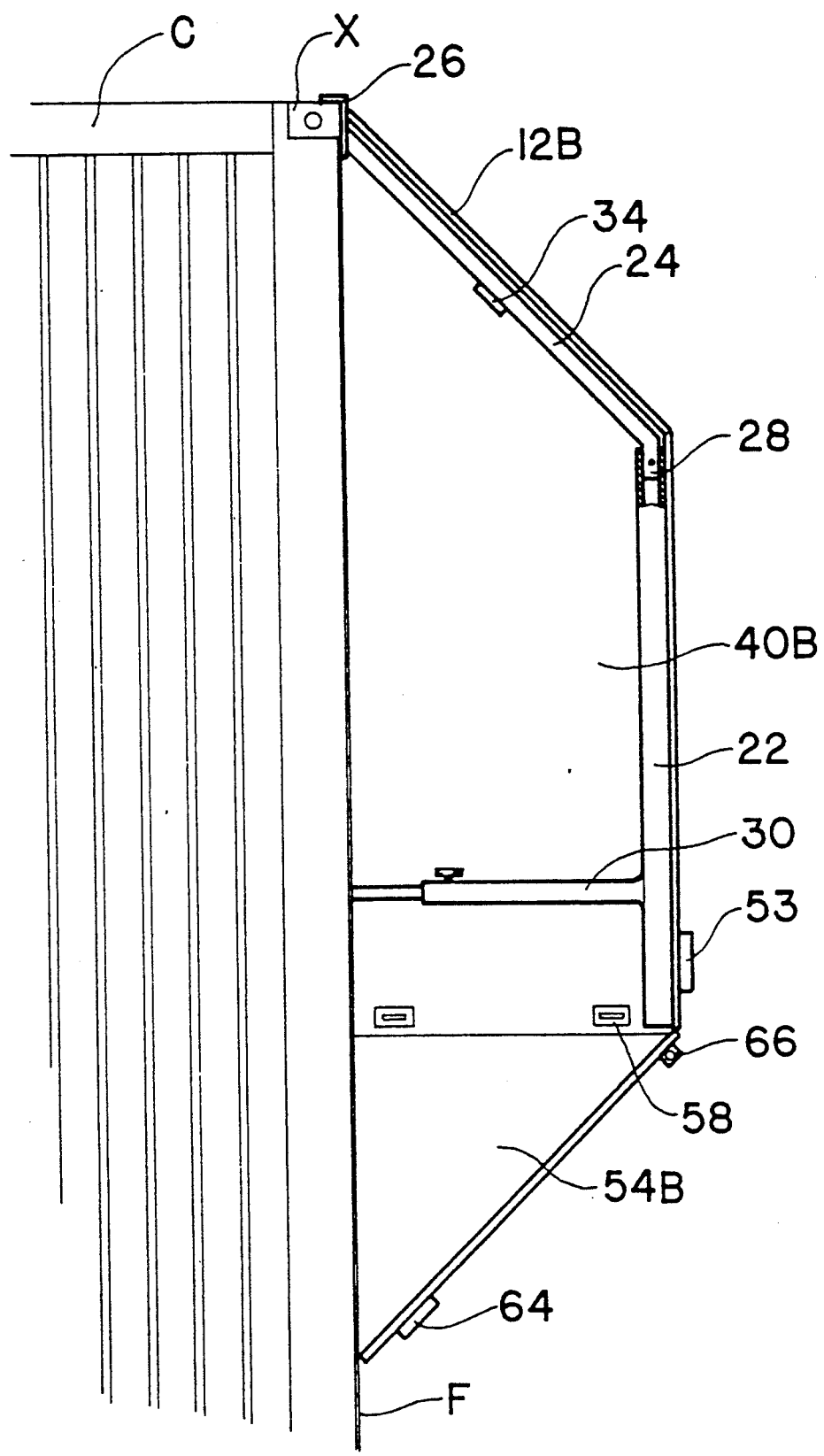
FIG. 4- is an elevational view partly in section of the right side of the air deflector as seen from the interior thereof, and FIG. 5- shows the air deflector demounted and stored in generally two dimensional form behind the cab of a tractor.
Figure 5:
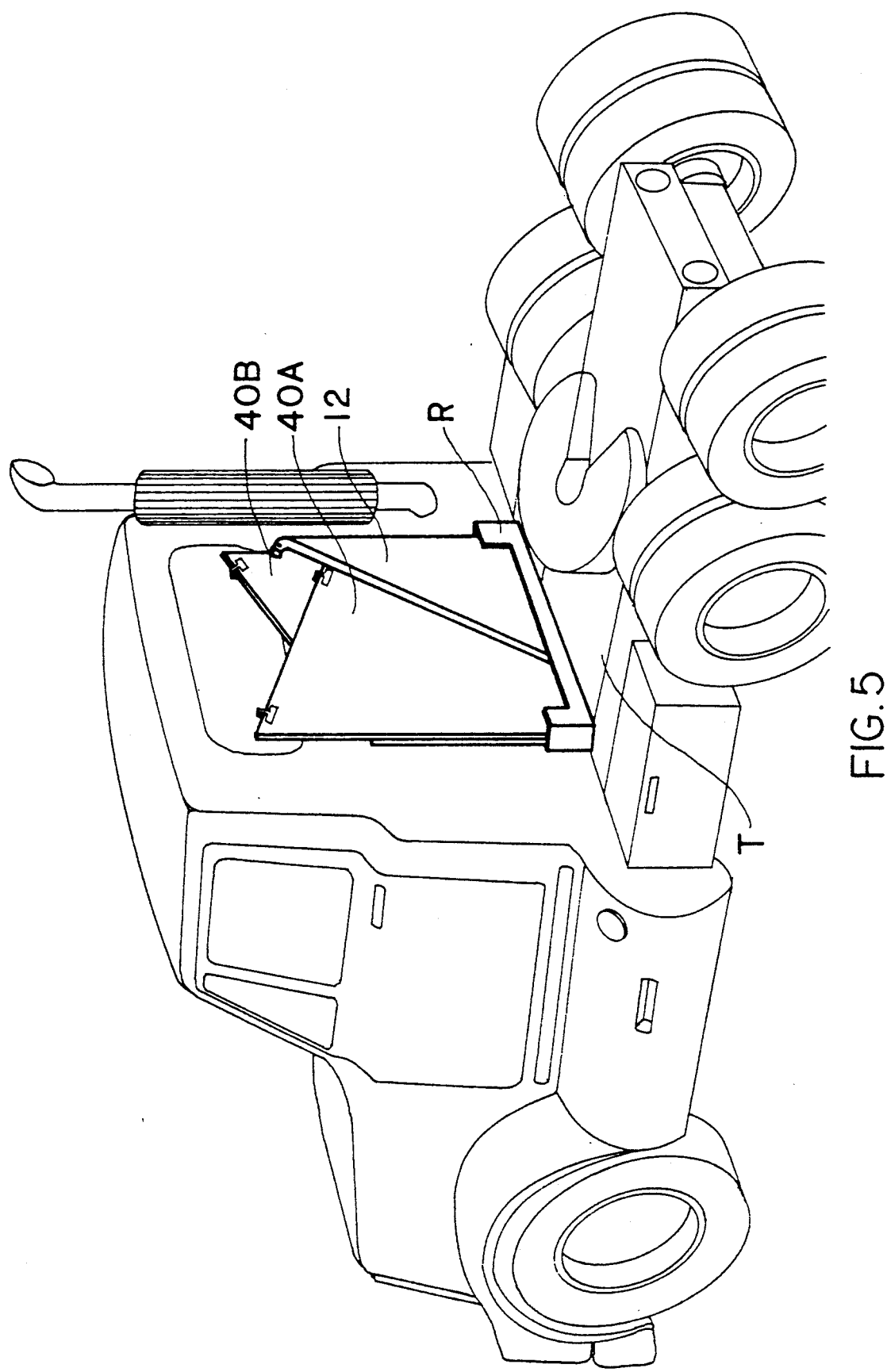

Panel 12 is conveniently and preferably formed from similar left and right halves, 12a 12b which are interconnected along the median passing through apex 16 by means of hinges 32. A support finger 34 is connected to the upper frame portion 24 by means of a pivot 36 which permits the finger to move between a position transverse to the upper frame portion, as illustrated in FIG. 3 wherein it supports the panel halves 12a, 12b in their open generally planar relationship, and a position aligned with the upper frame portion for the purposes of storage of deflector 10 when removed from container C, as will be explained later in more detail.

Figure 2:
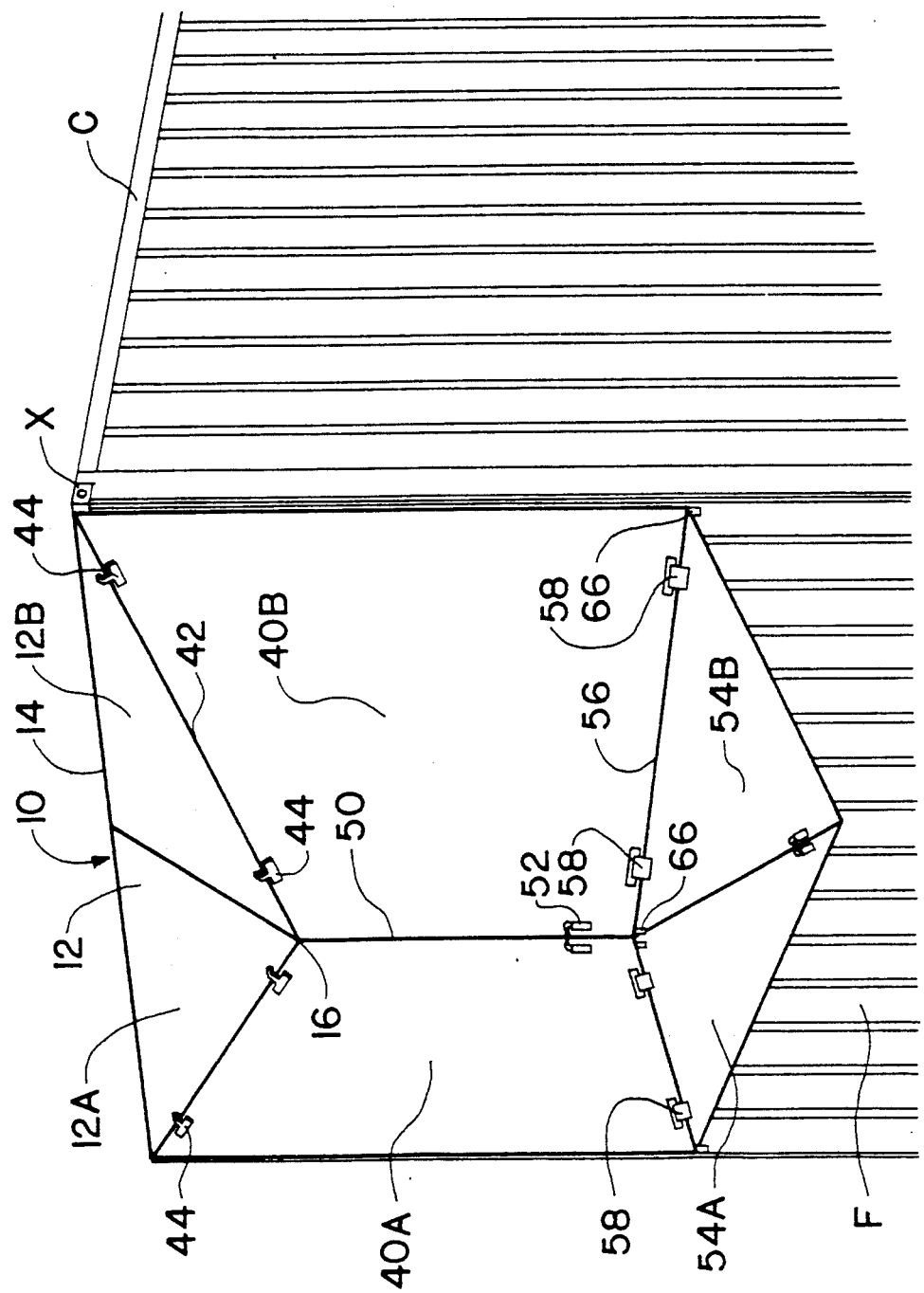
FIG. 2- is a close-up perspective view from the lower right side of the installed air deflector of FIG. 1.

Deflector 10 further includes a pair of similar trapezoidal panels 40a, 40b. As seen in FIG. 3, each panel has an upper edge 42 from which project a pair of hooks 44 adjacent each lateral end thereof. Edge 42 is generally coextensive with the side edges of panel 12. A pair of apertures 46 is provided in panel 12 adjacent each side edge of panel 12, into which apertures hooks 44 are engageable whereby panels 40a, 40b may be supported from panel 12. When so assembled, the forward edges of panels 40a, 40b, as seen in FIG. 3, are contiguous and form a vertical ridge 50 underlayed and supported by strut 22 of frame 20. The contiguous edges of panels 40a, 40b are retained together by means of a clip 52 insertable into a socket 53 provided on panels 40a, 40b. Panels 12, 40a, 40b together with the forward face F of container C, form a hollow triangular prism open at the lower end. This hollow prism is enclosed by means of a pair of similar lower triangular flaps 54a, 54b, which are connected along the upper edges 56 thereof to trapezoidal panels 40a, 40b along the lower edges thereof, conveniently by means of hinges 58. When flaps 54a, 54b are swung rearwardly in the direction of arrows 60, and seen in FIG. 3, the forward edges thereof will become contiguous, and they are retained together in this position by means of a clip 62 which engages in sockets 64 provided therefor. Flaps 54a, 54b are dimensioned such that when the forward edges thereof are contiguous, the rearward edge will be proximate face F on container C, as seen in FIG. 2, for example.

A plurality of tabs 66 are located at intervals on triangular flaps 54a, 54b adjacent the opposed ends of the upper edge 56 thereof which serve as attachment points for straps 70 which in turn secure to container C to stabilize air deflector 10.

The removal of air deflector 10 from its installed position on container C is generally merely the reverse of the method of installation described above. Straps 70 and clips 52, 62 are removed, thereby permitting panel 40a and flap 54a therewith to be unhooked from panel 12, and folded on hinges 58 to a substantially two dimensional condition for storage in a suitable receptacle R therefor provided on tractor T. Panels 40b, and flap 54b is similarly removed and stored, following which panel 12 may be unhooked from the container C using strut 22 to maneuver the panel. The panel removal and installation can accordingly be accomplished by one person without the use of any tool or other external assistance. Following the removal of panel 12, strut portion 22 is uncoupled for storage, and panel halves 12a, 12b folded on hinges 32 to a substantially flat, superposed position, and finger 34 pivoted to a position parallel to strut extension 24.

It will be apparent that many changes may be made to the illustrative embodiments, while falling within the scope of the invention and it is intended that all such changes be covered by the claims appended hereto.

I claim:

1. An air deflector for a shipping container or the like having a fixed face and opposed upper corners thereto with openings therein; said air deflector being demountable from said container for storage in a generally two dimensional condition and comprising;

a first, planar isosceles triangular panel having a base, two equal sides, and apex;

hook means located adjacent opposed ends of said base for engaging said corner openings for suspending said triangular panel therefrom;

a frame including a strut portion releasably couplable to said triangular panel to depend downwardly therefrom in oblique relationship;

said frame including at least one portion for bearing on said fixed face to retain said strut portion in spaced apart relationship from said fixed face;

second and third similar planar panels each having at least three sides, a first side thereof having a length generally identical one of the sides of said first triangular panel;

cooperating hook means on said first triangular panel and each of said second and third panels for releasably connecting each of said second and third panels to said first triangular panel when suspended with said one side of each of said second and third panels contiguous to respective ones of the sides of said first triangular panel;

said second and third panels being proportioned such that when a second side of each of said second and third panels when connected to said first triangular panel is contiguous with said fixed face to said container, third sides of each of said second and third panels are adjacent along the length thereof and reside in a vertical plane containing the apex of said first triangular panel, and means for releasably retaining said third sides in adjacent relationship.

2. An air deflector as defined in claim 1, wherein said second and third sides of said second and third panels are parallel.

3. An air deflector as defined in claim 2, wherein said second and third panels are trapezoidal.

4. An air deflector as defined in claim 3, including a pair of similar planar triangular flaps, each having a first side generally coextensive with a fourth side of said trapezoidal panel; hinge means connecting said fourth sides to respective coextensive said first sides of said pair of triangular flaps, each of said pair of triangular flaps being proportioned such that when a second side thereof is contiguous with said fixed face of said container, third sides thereof are adjacent and contained in said vertical plane.

5. An air deflector as defined in claim 4, including a plurality of guying points located adjacent at least one side of each of said pair of triangular flaps.

6. An air deflector as defined in claim 1, wherein said first triangular panel comprises similar left and right portions, and means interconnecting said left and right portion in hinged relationship, whereby said portions are movable between an open, generally coplanar position and a closed superposed position.

7. An air deflector as defined in claim 6, wherein said frame includes an upper portion rigidly connected to one of said left and right portions.

8. As air deflector as defined in claim 6, including means for supporting said left and right portions in said open portion.

9. An air deflector as defined in claim 7, including a bracket connected to said upper frame portion for supporting said frame portion from said container.

10. An air deflector as defined in claim 7, wherein said strut portion is releasably couplable to said triangular panel through said upper frame portion.

11. An air deflector as defined in claim 1, wherein said portion of said frame for bearing on said fixed face comprises a brace extending rearwardly from said strut portion intermediate the ends thereof.

12. An air deflector as defined in claim 11, wherein said brace is adjustable for length.

13. An air deflector as define in claim 11, wherein said brace retains said strut portion in a generally vertical position.

14. An air decoder as defined in claim 11, wherein said third edges of said second and third panels are contiguous with said strut and supported thereby.

* * * * *